(12) United States Patent
Sachs et al.

(10) Patent No.: US 11,511,350 B2
(45) Date of Patent: Nov. 29, 2022

(54) TECHNIQUES FOR DEPOWDERING ADDITIVELY FABRICATED PARTS VIA RAPID PRESSURE CHANGE AND RELATED SYSTEMS AND METHODS

(71) Applicant: Desktop Metal, Inc., Burlington, MA (US)

(72) Inventors: Emanuel M. Sachs, Newton, MA (US); Midnight Zero, Wilmington, MA (US)

(73) Assignee: Desktop Metal, Inc., Burlington, MA (US)

( * ) Notice: Subject to any disclaimer, the term of this patent is extended or adjusted under 35 U.S.C. 154(b) by 0 days.

(21) Appl. No.: 17/274,336

(22) PCT Filed: Sep. 13, 2019

(86) PCT No.: PCT/US2019/051151
§ 371 (c)(1),
(2) Date: Mar. 8, 2021

(87) PCT Pub. No.: WO2020/056355
PCT Pub. Date: Mar. 19, 2020

(65) Prior Publication Data
US 2021/0245249 A1  Aug. 12, 2021

Related U.S. Application Data

(60) Provisional application No. 62/730,953, filed on Sep. 13, 2019.

(51) Int. Cl.
*B22F 10/68* (2021.01)
*B33Y 40/20* (2020.01)
(Continued)

(52) U.S. Cl.
CPC ............... *B22F 10/68* (2021.01); *B08B 5/00* (2013.01); *B22F 12/70* (2021.01); *B33Y 40/20* (2020.01)

(58) Field of Classification Search
None
See application file for complete search history.

(56) References Cited

U.S. PATENT DOCUMENTS

2002/0074022 A1   6/2002   Loehr
2004/0072706 A1   4/2004   Arena-Foster et al.
(Continued)

OTHER PUBLICATIONS

International Search Report and Written Opinion dated Nov. 15, 2019 in connection with International Application No. PCT/US2019/051151.

(Continued)

*Primary Examiner* — Colin W. Slifka
(74) *Attorney, Agent, or Firm* — Wolf, Greenfield & Sacks, P.C.

(57) ABSTRACT

Techniques for depowdering additively fabricated parts are described in which powder is separated from parts by creating a large pressure differential between the powder and parts and a nearby location. The pressure differential may cause gas to quickly flow into and/or around the powder and parts, thereby producing a force against the powder and parts. Since the powder is generally much lighter than the parts, this force may be much more effective at moving the powder than moving the parts. As a result, the powder and parts may be separated from one another. The pressure differential may be created in various ways, such as by holding the parts and part in a chamber that is pressurized with air and/or other gas(es). Rapid depressurization of the chamber may produce the aforementioned pressure differential, leading to powder movement away from the parts.

15 Claims, 13 Drawing Sheets

(51) Int. Cl.
  *B22F 12/70* (2021.01)
  *B08B 5/00* (2006.01)

(56) References Cited

U.S. PATENT DOCUMENTS

2007/0126157 A1    6/2007   Bredt
2008/0006334 A1    1/2008   Davidson et al.
2017/0144224 A1    5/2017   DeMuth et al.
2018/0281284 A1*  10/2018   Elgar .................... B29C 64/364

OTHER PUBLICATIONS

PCT/US2019/051151, Nov. 15, 2019, International Search Report and Written Opinion.

* cited by examiner

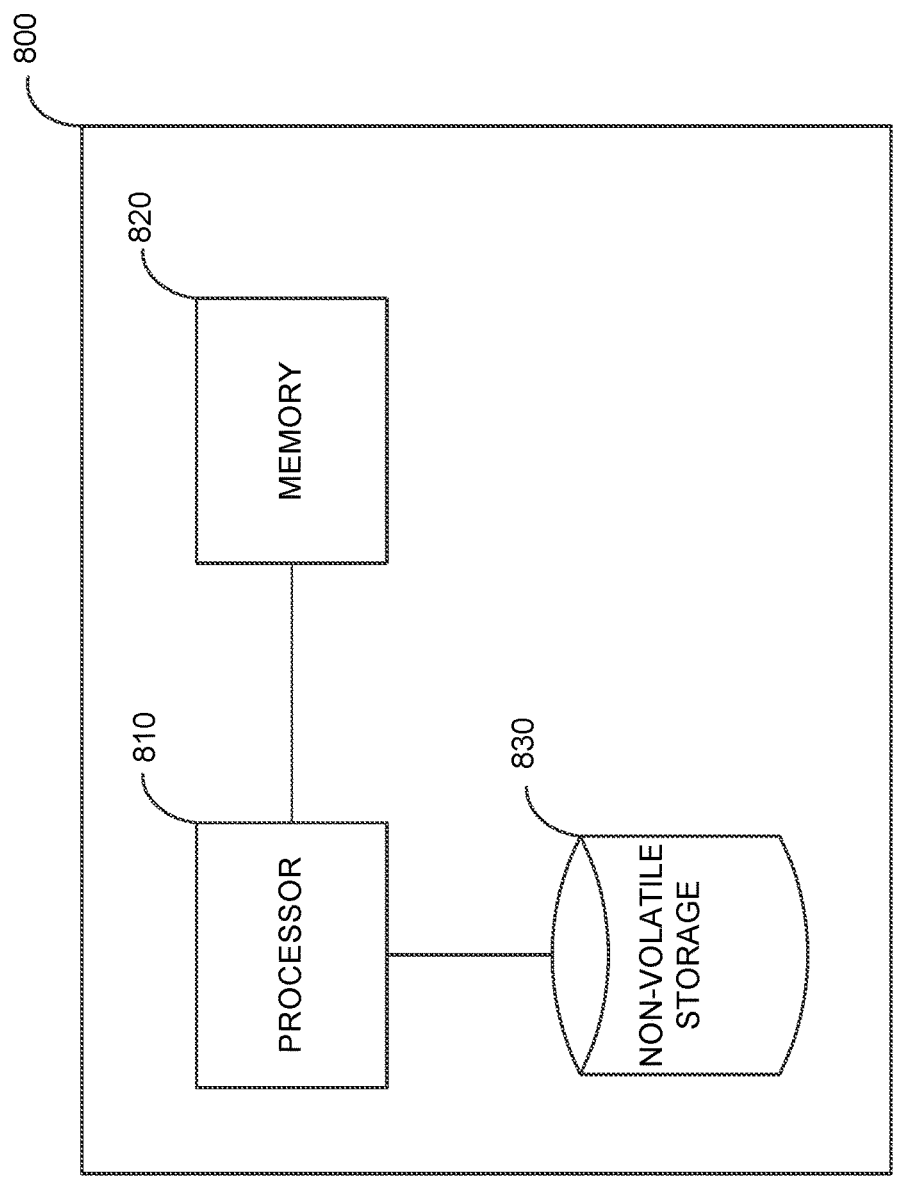

TECHNIQUES FOR DEPOWDERING ADDITIVELY FABRICATED PARTS VIA RAPID PRESSURE CHANGE AND RELATED SYSTEMS AND METHODS

CROSS-REFERENCE TO RELATED APPLICATIONS

The present application is a U.S. National Stage patent application under 35 U.S.C. § 371 of International Patent Application No. PCT/US2019/051151, filed Sep. 13, 2019, titled "Techniques for Depowdering Additively Fabricated Parts via Rapid Pressure Change and Related Systems and Methods", which claims the benefit under 35 U.S.C. § 119(e) of U.S. Provisional Patent Application No. 62/730,953, filed Sep. 13, 2018, titled "Methods and System for De-Powdering Printed Parts From a Powder Bed by Release of Pressure," each of which is hereby incorporated by reference in its entirety.

BACKGROUND

Additive fabrication, e.g. 3-dimensional (3D) printing, provides techniques for fabricating objects, typically by causing portions of a building material to solidify at specific locations. Additive fabrication techniques may include techniques categorized as vat photopolymerization, powder bed fusion, binder jetting, material jetting, sheet lamination, material extrusion, directed energy deposition, or combinations thereof. Many additive fabrication techniques build parts by forming successive layers, which are typically cross-sections of the desired object. Typically each layer is formed such that it adheres to either a previously formed layer or a substrate upon which the part is built.

In some additive fabrication technologies, parts may be fabricated by combining portions of a powder or other granular material to create fully dense parts. For example, additive fabrication techniques known as binder jetting may selectively apply a liquid to portions of a layer of powder, then a subsequent layer of powder may be deposited over the first layer, and additional liquid applied to additional portions of the new layer, and so on. At the end of such a process, the parts are disposed within a volume of the powder from which the parts must be separated.

SUMMARY

According to some aspects, a method is provided of depowdering one or more additively fabricated parts comprising bound metal powder and having unbound metal powder on their surface, the method comprising arranging the one or more additively fabricated parts within an interior of a chamber, pressurizing the interior of the chamber, and depressurizing the chamber, thereby causing at least some of the unbound metal powder to separate from the additively fabricated parts.

According to some aspects, a depowdering system is provided for removing powder from one or more additively fabricated parts comprising bound metal powder and having unbound metal powder on their surface, the depowdering system comprising a chamber comprising a door configured to be opened and closed such that the one or more additively fabricated parts can be introduced into the chamber when the door is opened, a holder arranged within the chamber and configured to hold the one or more additively fabricated parts, and a first valve arranged at an opposing side of the chamber from the holder, and at least one processor configured to control the first valve to perform a series of depowdering operations, each operation comprising pressurizing then depressurizing the interior of the chamber, and reorient the holder and thereby reorient the one or more additively fabricated parts during the series of depowdering operations.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIG. 8 illustrates an example of a computing system environment on which aspects of the invention may be implemented;

DETAILED DESCRIPTION

Figure 1:
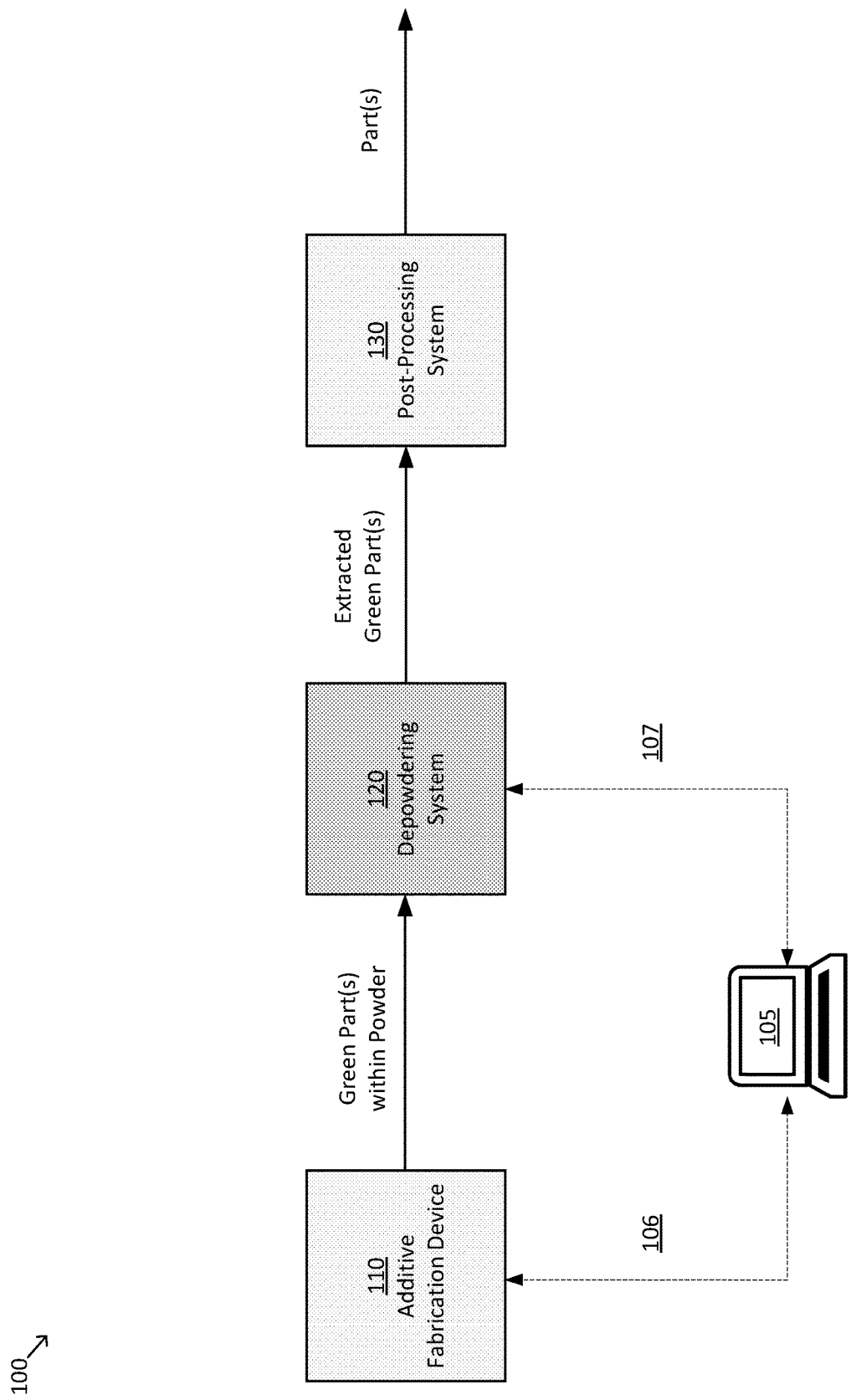
FIG. 1 is a block diagram of an additive fabrication system that includes a depowdering sub-system, according to some embodiments.

As discussed above, some additive manufacturing techniques fabricate parts from and within a granular material such as a powder. One example is binder jetting, in which parts are formed by applying a liquid (e.g., a binder) to regions of successive layers of powder, thereby producing parts (which are 'bound' regions of the powder) within a volume of unbound powder. Such parts are often referred to as "green" parts since they must undergo subsequent processing, such as sintering, to produce a final part. Other illustrative additive fabrication techniques that fabricate parts from a powder include direct laser melting, direct metal laser sintering, or selective laser sintering, in which regions of successive layers of a material (e.g., metal, nylon) are melted through application of directed energy.

Irrespective of how parts are formed from a powder or other granular material, subsequent to the additive fabrication process these parts are accessed by separating the parts from the material. This process of retrieving parts from a granular material in which the parts are formed is referred to herein as "depowdering," although it will be appreciated that techniques described herein are not limited to use cases in which the additional material comprises or consists of a powder. As such, while the discussion below may focus primarily on separating parts from a powder, it will be appreciated that any discussion of depowdering may also apply to separating additively fabricated parts from other granular materials.

Depowdering is frequently a laborious process due to the fine nature of the powder. Handling of the powder may cause a great deal of mess and, depending on the powder material, may also present safety concerns due to inhalation or flammability. Typically, depowdering is performed in a manual process of excavation that utilizes vacuum hoses and brushes to separate the parts from the powder. This process can take a great deal of time and in cases where the parts are fragile, can result in damage to the parts during excavation. Moreover, many powders used for additive fabrication, such as metal and/or ceramic powders, may exhibit low flowability which makes moving particles of the powder difficult due to the tendency of the powder to "clump" rather than flow away from the additively fabricated parts.

While, as discussed above, there are multiple additive fabrication technologies for which depowdering is performed, the process of depowdering may not be equally straightforward for each of these technologies. For instance, direct laser melting may produce solid metal parts during additive fabrication so that, prior to depowdering, the parts are embedded within a metal powder. Since the parts are solid metal, there is typically not a significant risk of damage to the parts during depowdering and so a wide range of simple techniques may be effective at separating the parts from the powder. In contrast, green parts produced in binder jetting comprise regions of bound powder held together by a liquid and may be considerably more fragile than parts produced by direct laser melting. Consequently, depowdering approaches that are effective for direct laser melting or selective laser sintering may not be suitable for parts produced through binder jetting since they may cause damage to the parts.

The inventors have recognized and appreciated techniques for depowdering that separate powder from parts by creating a large pressure differential between the powder and parts and a nearby location. This pressure differential causes gas in proximity to the powder and parts to quickly flow into, through and/or around the powder and parts, thereby producing a force against the powder and parts. Since the powder is generally much lighter than the parts, the gas flow may be much more effective at moving the powder than moving the parts. As a result, the powder and parts may be separated from one another. The pressure differential may be created in various ways, such as by holding the parts and powder in a chamber that is pressurized with air and/or other gas(es). Rapid depressurization of the chamber may produce the aforementioned pressure differential, leading to powder movement away from the parts.

The approaches described herein generally mobilize the powder and separate it from the parts by utilizing the fact that powder is lighter and more movable than the parts embedded within it. While some green parts, such as green parts produced by binder jetting, may be fragile with respect to scraping or impacts, such parts may nonetheless be resistant to damage from rapidly moving gas, even if directed at a high pressure. Many of the techniques described herein for depowdering through directed application of gas may be automated, as discussed further below, thereby mitigating the above-described challenges associated with manual depowdering operations.

According to some embodiments, techniques described herein for depowdering parts may be applied by a depowdering system that is separate from an additive fabrication device that fabricated the parts. This approach may provide advantages for throughput, since it may allow for an additive fabrication device to begin fabricating a second group of parts while a first group of parts is being depowdered. Moreover, in use cases in which additive fabrication takes more or less time than the subsequent depowdering step, multiple additive fabrication devices and/or depowdering systems may be employed to minimize downtime of the additive fabrication device(s) and depowdering system(s). For instance, in a simple case where additive fabrication takes half as long as depowdering, two depowdering systems could be operated in parallel so that the additive fabrication device and the two depowdering systems could be operated continuously to maximize throughput.

According to some embodiments, a depowdering system as described herein may be configured to receive a build box from an additive fabrication device and to perform depowdering on contents of the build box. As referred to herein, a "build box" includes any structure in which parts may be fabricated within a powder by an additive fabrication device, and that may be removed from the additive fabrication device subsequent to fabrication. In some embodiments, a depowdering system may be configured to receive a build box and to directly depowder parts within the build box while the parts are largely contained within the build box. In some embodiments, a depowdering system may be configured to receive a build box and to meter contents of the build box into or onto an apparatus within the depowdering system. In this case, the depowdering system may perform depowdering on successive subsections of the build box by metering a subsection, depowdering the subsection, metering another subsection, etc.

Irrespective of how a depowdering system may be configured to operate upon the contents of a build box, the depowdering system may be configured with a receptacle sized for the build box such that the build box can be removably mounted or otherwise removably attached to the depowdering system. Subsequent to depowdering, a build box may be removed from the depowdering system and reused for fabrication. At this stage in the process, the build box may, for instance, be empty or may contain only powder, depending on the particular type of depowdering operations performed as discussed below.

It may be noted that additively fabricated parts being depowdered may be porous. For instance, in binder jet technologies, a dried binder may fill only a portion of the space that is not filled by powder. Thus, during depowdering through rapid pressure change, compressed gas may escape through the parts themselves. Thus, operating parameters such as pressure and speed of decompression may be selected so that that proper cleaning and ejection of powder may occur in spite of the parts themselves being porous, and without damage to the parts.

Reference is made herein to techniques in which depowdering operations are applied to parts embedded within powder. Generally, subsequent to excavation of such parts additional powder may still be adhered to the surface and additional depowdering may be necessary to produce a completely clean part. These two different types of depowdering are referred to herein as "coarse" and "fine" depowdering, wherein "coarse" depowdering broadly refers to excavating parts from powder and "fine" depowdering broadly refers to removing comparatively small amounts of powder from the surface of an excavated part. It will be appreciated that, the use of these terms notwithstanding, depowdering operations need not be rigidly categorized into purely coarse or purely fine depowdering operations. As such, these terms are used merely to aid description of the types of effects that may be produced by the techniques described herein, and should not be viewed as limiting.

Following below are more detailed descriptions of various concepts related to, and embodiments of, techniques for depowdering additively fabricated parts through rapid changes in pressure. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 is a block diagram of an additive fabrication system that includes a depowdering sub-system, according to some embodiments. System 100 includes an additive fabrication device 110, a depowdering system 120, a post-processing system 130 and computing device 105. System 100 may, for instance, represent the production pipeline for an additive fabrication technology in which parts are fabricated from a powder, examples of which may include binder jetting, direct metal laser sintering, direct laser melting or selective laser sintering. In general, any number of each of additive fabrication device 110, depowdering system 120 and post-processing system 130 may be included in such a pipeline, although a single instance of each will be discussed in relation to FIG. 1 for simplicity. As discussed above, a system that includes multiple devices at a given stage in the pipeline may provide for increased throughput by minimizing downtime of the devices in the pipeline.

In the example of FIG. 1, the additive fabrication device 110 may be configured to fabricate three-dimensional parts from one or more source materials. In particular, the additive fabrication device 110 may be configured to fabricate the parts from a powder or other granular source material. According to some embodiments, the source material may include a metal powder and/or a ceramic powder. Depending on the particular embodiment, a source material may for instance comprise a pure metal powder, a metal alloy powder, an intermetallic compound powder, one or more powder compounds containing at least one metallic element, and/or one or more ceramic powders. In some embodiments, the source material comprises pre-alloyed atomized metallic powders, a water or gas atomized powder, a mixture of a master alloy powder and an elemental powder, a mixture of elemental powders selected to form a desired microstructure upon the interaction of the elemental species (e.g., reaction and/or interdiffusion) during a post-processing step (e.g., sintering), one or more ceramic powders, and/or any other suitable materials. In some instances, the source material may comprise a sinterable powder, and/or the source material may be compatible with an infiltration process. Moreover, the source material may contain such wetting agents, flow improvers, coatings, and other powder modifications found to be useful in the sintering or infiltration of additively fabricated parts. Accordingly, it should be understood that the current disclosure is not limited to any particular material and/or combination of materials comprising the source material, nor is the current disclosure is limited to any particular type of additive manufacturing process.

Figure 3:
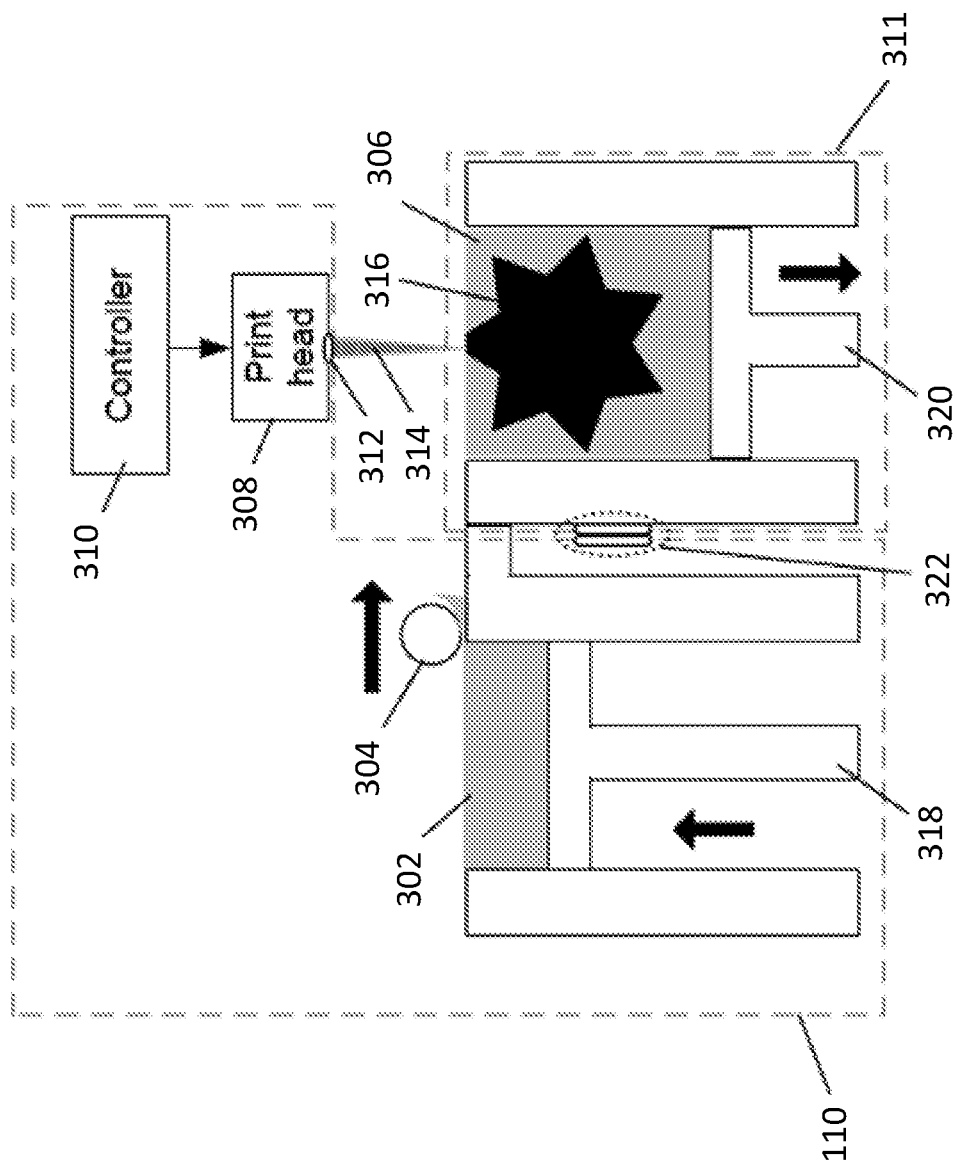
FIG. 3 depicts an illustrative additive fabrication device, according to some embodiments.

An illustrative example of a suitable additive fabrication device 110 is illustrated in FIG. 3. In the example of FIG. 3, additive fabrication device 110 is coupled to a build box 311 via coupling 322 and is configured to fabricate parts 316 within the build box. Additive fabrication device 110 includes a material deposition mechanism 318 which be operated by controller 310 to deposit source material 302 onto fabrication platform 320, and a print head 308 which may be controlled to move across the powder to deliver liquid 314 such as a binder onto the powder 306. In the illustrated example, material deposition mechanism 304 comprises a roller that may be operated to move over the deposited source material to spread the source material evenly over the surface. The print head may include one or more orifices 312 through which a liquid (e.g., a binder) can be delivered from the print head to each layer of the source material. In certain embodiments, the print head can include one or more piezoelectric elements, and each piezoelectric element may be associated with a respective orifice and, in use, each piezoelectric element can be selectively actuated such that displacement of the piezoelectric element can expel liquid from the respective orifice.

Returning to FIG. 1, and the illustrative embodiment of the additive fabrication device 110, the print head may be controlled (e.g., by computing device 105) to deliver liquid such as a binder onto a powder in predetermined two-dimensional patterns, with each pattern corresponding to a respective layer of a three-dimensional part. In this manner, the delivery of the binder may perform a printing operation in which the source material in each respective layer of the three-dimensional part is selectively joined along the pre-determined two-dimensional layers. After each layer of the part is formed as described above, the platform may be moved down and a new layer of powder deposited, binder again applied to the new powder, etc. until the part has been formed.

In the example of FIG. 1, parts produced by the additive fabrication device 110 may be referred to as "green" parts since they must undergo subsequent processing to produce a final part. Moreover, the parts produced by the additive fabrication device 110 may be contained within a volume of powder or other granular material, necessitating their extraction by the depowdering system 120. Various embodiments of the depowdering system (and/or elements of the depowdering system 120) are discussed further below.

Parts produced by the additive fabrication device 110 may be wet while sitting in the powder from which they were formed. In some cases, the binder fluid is dried while the parts are still in the powder bed to improve the strength of the resulting parts. In these cases, the term "green part" may refer to the part after such drying has taken place. In some cases, a cross-linking step is performed while the parts are still in the powder to make the parts even stronger. Subsequent to such cross-linking, the part may be termed "brown parts," and accordingly it may be brown parts that are removed from the powder during depowdering. Both drying and cross-linking may involve the application of heat and, especially in the case of drying, the flow of a gas to help carry the moisture away.

Post-processing system 130 may include one or more devices suitable for transforming an extracted green part into a final part, which may include one or more debinding devices and/or furnaces. In systems employing a binder jetting process, extracted green parts can undergo one or more debinding processes in the post-processing system 130 to remove all or a portion of the binder system from the parts. As such, post-processing system 130 may include a thermal debinding device, a supercritical fluid debinding device, a catalytic debinding device, a solvent debinding device, or combinations thereof. In some embodiments, post-processing system 130 may include a furnace. Extracted green parts may undergo sintering in the furnace such that particles of the powder (or other granular material) combine with one another to form a finished part. In some embodiments, a furnace may be configured to perform one or more debinding processes within the furnace while extracted green parts undergo sintering.

According to some embodiments, the production of parts by system 100 may be partially or fully automated. In particular, the system may be configured to move parts embedded within powder from the additive fabrication device 110 to the depowdering system 120, and/or may be configured to move parts from the depowdering system 120 to the post-processing system 130. Automated motion may comprise one or more robotics system and/or conveyor belts, which may be configured to move parts (or parts embedded within powder) between devices in system 100, which may include motion between the three stages 110, 120 and 130 depicted in FIG. 1 and/or may be configured to move parts internally to one of the stages (e.g., moving parts between two depowdering devices of depowdering system 120). Automated motion may include automated removal of a build box from a device and/or insertion of a build box into a device. For instance, in some embodiments a build box may be automatically removed from the additive fabrication device 110 and automatically moved to, and inserted into, a component of depowdering system 120.

In some embodiments, the additive fabrication device 110 may fabricate parts within a build box, which may be automatically transferred from the additive fabrication device to the depowdering system 120. Depowdering system 120 may, as discussed above, be configured to receive a build box and to directly depowder parts within the build box while the parts are largely contained within the build box. In some embodiments, a depowdering system may be configured to receive a build box and to meter contents of the build box into or onto an apparatus within the depowdering system. In this case, the depowdering system may perform depowdering on successive subsections of the build box by metering a subsection, depowdering it, metering another subsection, etc.

According to some embodiments, automated movement as described above may be controlled by computing device 105. In the example of FIG. 1, computing device 105 is provided as an illustrative example of a suitable controller that may be configured to control various automated operations of the additive fabrication device 110 and/or depowdering system 120. However, it will be appreciated that system 100 may also be operated by multiple separate computing devices, including standalone computing devices and/or computing devices installed within the additive fabrication device 110, depowdering system 120 or post-processing system 130. Such computing devices may or may not be coupled to one another. As such, it will be appreciated that the below discussion of the various computational tasks that computing device 105 may be configured to perform need not be implemented using a single computing device as shown, but could be implemented on any number of different computing devices, which may be located within, or separate from, any of the elements of system 100. In particular, some computational tasks may be implemented by one such computing device but not another so that different computing devices may be configured to perform different functions from one another.

According to some embodiments, computing device 105 may be configured to generate two-dimensional layers that may each comprise sections of an object. Instructions may then be generated from this layer data to be provided to additive fabrication device 110 that, when executed by the device, fabricates the layers and thereby fabricates the object. Such instructions may be communicated via a communication link 106, which may comprise any suitable wired and/or wireless communications connection. In some embodiments, a single housing may hold the computing device 105 and additive fabrication device 110 such that the link 106 is an internal link connecting two modules within the housing of the device.

According to some embodiments, computing device 105 may be configured to receive, access, or otherwise obtain instructions generated to cause the additive fabrication device 110 to fabricate one or more parts, and may execute said instructions, thereby causing the additive fabrication device to fabricate the one or more parts. For instance, the instructions may control one or more motors of the additive fabrication device 110 to move components of the device to deposit powder, deposit liquid binder onto a layer of the powder, etc.

According to some embodiments, computing device 105 may be configured to generate instructions that, when executed by the depowdering system 120, automatically performs depowdering operations, examples of which are described below. Such instructions may be communicated via a communication link 107, which may comprise any suitable wired and/or wireless communications connection. In some embodiments, a single housing may hold the computing device 105 and depowdering system 120 such that the link 107 is an internal link connecting two modules within the housing of a device of the system.

In some embodiments, instructions to be executed by the depowdering system 120 may be generated based on the geometry of parts to be fabricated (or that were fabricated) by the additive fabrication device 120. As discussed further below, certain depowdering techniques may be based on, or may be improved by, removing powder from locations having a known relative location to parts within the powder. In some cases, instructions to be executed by the depowdering system 120 may be generated based on the locations of parts within the powder bed of the additive fabrication device 110 (or the expected locations after fabrication). As such, instructions to cause the additive fabrication device 110 to fabricate one or more parts may be generated by the computing device 105 as part of the same operation in which instructions are generated to be executed by the depowdering system 120. For example, computing device 105 may perform computational operations to arrange one or more parts to be fabricated within a three-dimensional volume representing the build volume of the additive fabrication device. The computing device 105 may then perform slicing of the parts in the volume and generate instructions for the additive fabrication device 110 to form successive layers of the parts, and in addition, may also generate instructions to be executed by the depowdering system based on the location and geometry of the parts within the volume.

As discussed above, a depowdering system may perform depowdering on contents of a build box, either by directly depowdering parts within the build box while the parts are largely contained within the build box, or by metering contents of the build box into or onto an apparatus within the depowdering system. As examples of these two types of approaches, FIGS. 2A-2E depict illustrative operations that may be performed by a depowdering system to prepare the contents of a build box for depowdering operations, according to some embodiments.

In each of the examples of FIG. 2A-2E, some portion of a mixture of powder and parts is prepared for one or more depowdering operations. A mixture of powder and parts so prepared may be referred to herein as a "powder bed," irrespective of whether the mixture represents the entire contents of a build box or some subset of the contents of a build box, and irrespective of whether the mixture is held or supported by the build box or has been removed entirely from the build box. Accordingly, techniques described below as being applied to a powder bed may be understood as being applicable to any mixture of powder and parts, including but not limited to the various results of the operations of FIGS. 2A-2E.

Figure 2A:
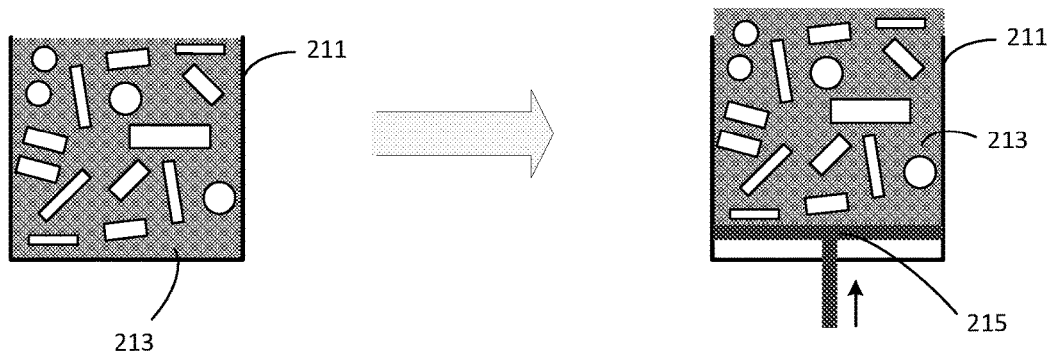
FIGS. 2A-2E depict illustrative operations that may be performed by a depowdering system to prepare the contents of a build box for depowdering operations, according to some embodiments.

In the example of FIG. 2A, a build box 211 initially comprises a mixture of powder and parts 213. Subsequently, a bottom surface of the build box is pushed upward by a delivery mechanism 215, which causes an upper section of the mixture of powder and parts 213 to be pushed beyond the upper edges of the build box. According to some embodiments, the build box 211 may comprise a plate arranged over the bottom of the build box onto which the powder and parts may be deposited. The delivery mechanism 215 may then engage with the plate and push it upwards within the build box. Alternatively, the bottom of the build box may be movable and the delivery mechanism 215 may engage with the bottom of the box and push it upwards.

Figure 2B:
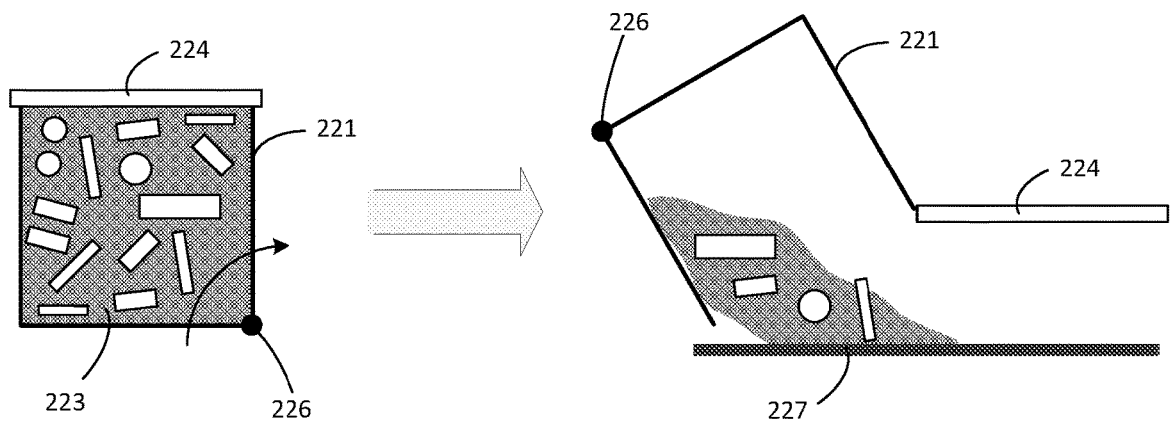

In the example of FIG. 2B, a build box 221 initially comprises a mixture of powder and parts 223 and has a cover 224 over the contents of the build box. Subsequently, the build box may be rotated around axis 226 and the lid may be automatically opened, thereby spilling contents of the build box 221 onto a desired surface 227.

Figure 2C:
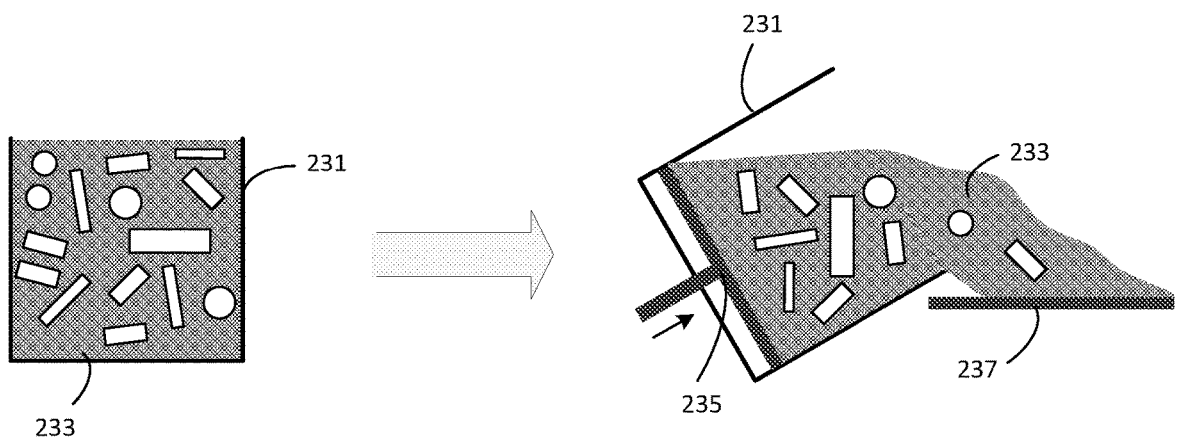

In the example of FIG. 2C, a build box 231 initially comprises a mixture of powder and parts 233. Subsequently, a bottom surface of the build box is pushed upward by a delivery mechanism 235, which causes an upper section of the mixture of powder and parts 233 to be pushed beyond the upper edges of the build box. Simultaneously, the build box is rotated, the combination of which cause contents of the build box to spill onto a desired surface 237. According to some embodiments, the build box 231 may comprise a plate arranged over the bottom of the build box onto which the powder and parts may be deposited. The delivery mechanism 235 may then engage with the plate and push it upwards within the build box. Alternatively, the bottom of the build box may be movable and the delivery mechanism 235 may engage with the bottom of the box and push it upwards.

Figure 2D:
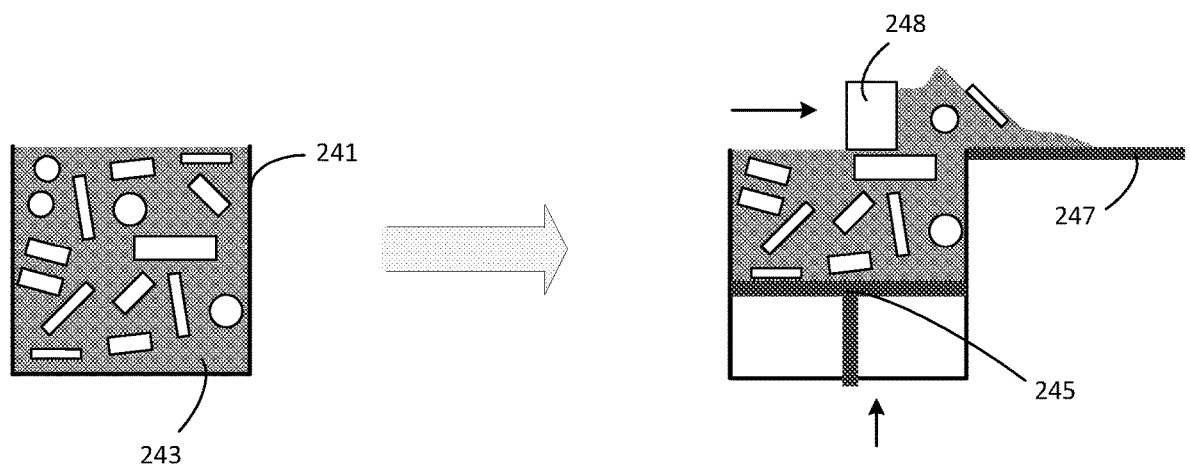

In the example of FIG. 2D, a build box 241 initially comprises a mixture of powder and parts 243. Subsequently, a bottom surface of the build box is pushed upward by a delivery mechanism 245, which causes an upper section of the mixture of powder and parts 243 to be exposed above the upper edges of the build box. Simultaneously or subsequently, a scraper 248 is moved over the surface of the build box, pushing the exposed powder and/or parts onto an adjacent surface 247. The scraper may for instance be wider than the box build and coupled to one or more actuators configured to move the scraper over the opening of the build box. According to some embodiments, the build box 241 may comprise a plate arranged over the bottom of the build box onto which the powder and parts may be deposited. The delivery mechanism 245 may then engage with the plate and push it upwards within the build box. Alternatively, the bottom of the build box may be movable and the delivery mechanism 245 may engage with the bottom of the box and push it upwards.

Figure 2E:
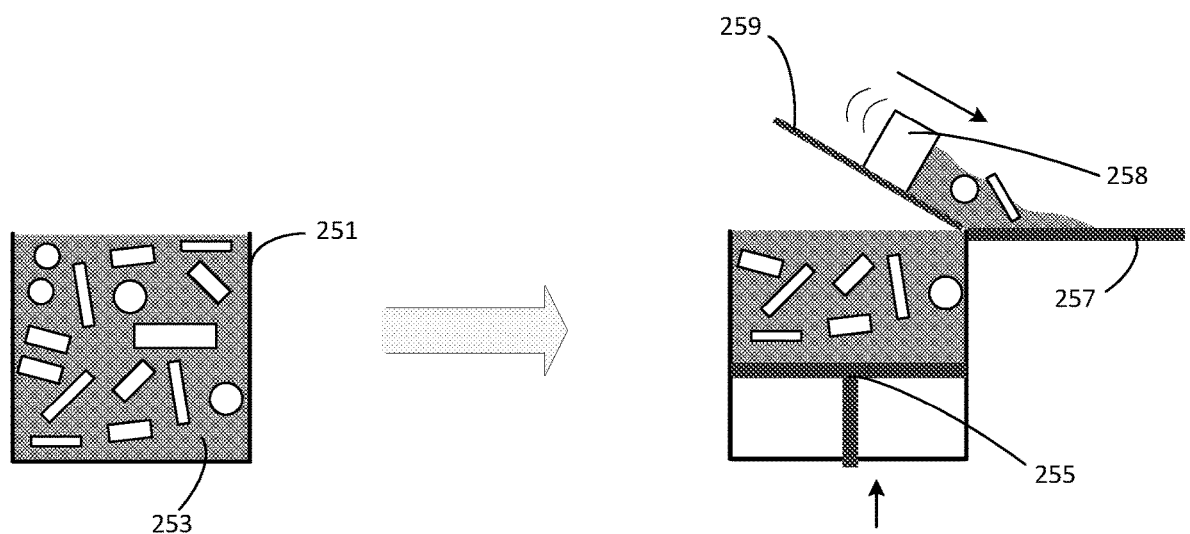

In the example of FIG. 2E, a build box 251 initially comprises a mixture of powder and parts 253. Subsequently, a bottom surface of the build box is pushed upward by a delivery mechanism 245, which causes an upper section of the mixture of powder and parts 243 to be exposed above the upper edges of the build box. Simultaneously or subsequently, a plate 259 is inserted into the exposed mixture of powder and parts and raised to incline the mixture on the plate 259. Simultaneously with insertion or inclination of the plate 259, or subsequently, scraper 258 is moved along the plate 259 to push the separated portion of the mixture 253 onto surface 257. In some cases, the plate 259 may be vibrated to aid the mixture of powder and parts to slide down the include onto surface 257. According to some embodiments, the build box 251 may comprise a plate arranged over the bottom of the build box onto which the powder and parts may be deposited. The delivery mechanism 255 may then engage with the plate and push it upwards within the build box. Alternatively, the bottom of the build box may be movable and the delivery mechanism 255 may engage with the bottom of the box and push it upwards.

In each of the examples of FIGS. 2A-2E, where components are described above as being moved, said motion may comprise, in each individual case, any combination of manual and/or automated motion. Automated motion may include execution of instructions by a suitable computing device to operate one or more components of the depowdering system 120, such as one or more actuators, to produce motion and/or may include motion produced by a user manually interacting with the depowdering system 120 (e.g., presses a button), which then automatically operates the one or more components of the depowdering system 120 to produce motion.

Irrespective of how parts are fabricated and removed from a build box, in general the parts may undergo an initial stage of depowdering in which the parts are excavated from the powder ("coarse" depowdering). Additional powder still adhered to the surface may then be removed to produce a completely clean part ("fine" depowdering). Techniques described herein are generally applicable to fine depowdering operations, though are not necessarily limited as such. According to some embodiments, parts may be automatically depowdered in a coarse depowdering step, and automatically delivered to the below-described devices for fine depowdering through rapid changes in pressure.

For instance, a depowdering system may comprise any of the devices described in relation to FIGS. 2A-2E for metering portions of a build box, a device configured to perform coarse depowdering of a metered portion and thereby extract parts, and a conveyor belt arranged to convey the parts to any of the below-described devices for performing additional depowdering through rapid changes in pressure. As such, this illustrative depowdering system may receive a build box and perform coarse and fine depowdering on successive metered portions of the build box in an automated fashion.

Figure 4:
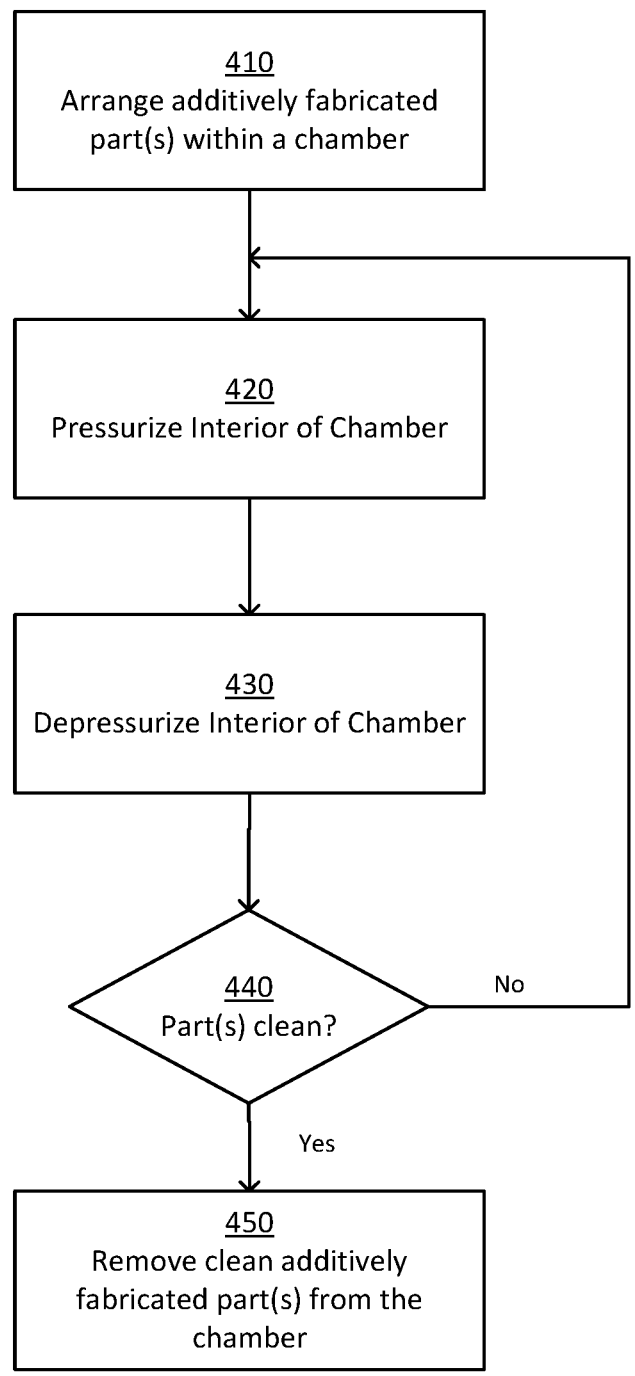
FIG. 4 is a flowchart of a method of depowdering through rapid pressure change, according to some embodiments.

FIG. 4 is a flowchart of a method of depowdering through rapid changes in pressure, according to some embodiments. In particular, method 400 relates to a process of pressurizing and depressurizing a chamber comprising one or more additively fabricated parts. Method 400 may be performed by a suitable depowdering system, examples of which are described below.

In act 410, the one or more additively fabricated parts are arranged within a chamber. The chamber may be formed from any suitable material, such as metal and/or plastic, and may be structured to withstand pressures several times above atmosphere. In some embodiments, the chamber may have a length that is greater than the chamber height, for reasons discussed below. For instance, the ratio of the chamber length to the chamber height may be between 2 and 5, or between 3 and 6.

The chamber may comprise one or more doors and/or other means of access into the chamber's interior that may be opened and closed, and that are large enough that the one or more additively fabricated parts may be placed in the container. The part(s) may be arranged in the chamber in act 410 via manual and/or automated techniques (e.g., using a robotic arm and/or a conveyor belt). The chamber may comprise a pressure seal attached to a door and/or attached to the body of the chamber so that when the door is closed a pressure seal may be formed around the door to prevent pressurized gas within the chamber escaping around the door.

In act 420, the interior of the chamber may be pressurized by introducing gas into the chamber. For instance, a source of compressed gas may be coupled to the chamber such that gas flows into the chamber, and/or a gas pump may be coupled to the chamber to increase the pressure of gas within the chamber. While the chamber may in some cases be filled with air, in general any compressed gas may supplied into the chamber, including inert gases such as nitrogen gas, carbon dioxide, noble gases, or combinations thereof.

In some embodiments, act 420 may comprise opening one or more valves to initiate a flow of gas into the chamber. Such valves may be operated manually and/or may be automatically controlled by a coupled computing device. For example, a source of compressed gas may be coupled to the chamber via a valve that may be actuated to open and closed positions by a computing device coupled to the valve. Similarly, a pump may be activated or deactivated by a computing device coupled to the pump. In this manner, pressurization of the chamber in act 420 may be automated.

According to some embodiments, in act 420 the chamber may be pressurized to a pressure that is equal to or greater than 20 pounds of pressure per square inch (psi), 50 psi, 75 psi, 100 psi, 150 psi, 200 psi, or 300 psi. According to some embodiments, in act 420 the chamber may be pressurized to a pressure that is less than or equal to 500 psi, 300 psi, 200 psi, 150 psi, 100 psi or 75 psi. Any suitable combinations of the above-referenced ranges are also possible (e.g., a pressure greater than or equal to 40 psi and less than or equal to 150 psi).

In act 430, the interior of the chamber may be depressurized by removing gas from the interior of the chamber. Depressurization of the chamber may be achieved by opening one or more valves coupling the interior of the chamber to any location exterior of the chamber, wherein the location exterior of the chamber is at a lower pressure than the interior. As a result, movement of the gas within the chamber towards the exterior location will occur. In some embodiments, the location exterior to the chamber may be the ambient environment around the chamber (e.g., atmosphere). In some embodiments, the location exterior to the chamber may be at a pressure below atmosphere. For instance, depressurization of the chamber may be achieved by opening a valve of the chamber that is coupled to a low pressure source, such as a vacuum pump and/or a vessel that has been pumped to a pressure below that of atmospheric pressure.

According to some embodiments, depressurization of the chamber in act 430 may result from increasing the pressure within the interior of the chamber in act 420 until the critical pressure of one or more pressure relief components is exceeded. For instance, a plate may be affixed to the chamber such that the plate will only remain affixed until the pressure within the chamber is around 200 psi. As such, increasing the pressure within the chamber will eventually cause the plate to blow off and the gas within the escape through the outlet created by the absence of the plate. Suitable pressure relief components may include a dump valve.

As discussed above, depressurization of the chamber as the resulting gas flow within the chamber may be expected to cause significant movement of powder without also causing much motion (if any) of the parts themselves. As such, the parts and powder may be separated.

According to some embodiments, in act 430 the interior of the chamber may be depressurized in an amount of time having a time constant of greater or equal to 0.1 ms, 0.2 ms, 0.5 ms, 1 ms, 2 ms, 5 ms, or 10 ms (where the time constant is a time taken for the pressure to reach $$1 - \frac{1}{e}$$

of its initial value). According to some embodiments, in act 430 the interior of the chamber may be depressurized in an amount of time having a time constant of 50 ms, 20 ms, 15 ms, 10 ms, 7 ms, 5 ms, 3 ms, or 1 ms. Any suitable combinations of the above-referenced ranges are also possible (e.g., a time constant greater than or equal to 0.2 ms and less than or equal to 5 ms).

In some embodiments, act 430 may comprise automatically opening one or more valves to initiate a flow of gas out of the chamber. For example, a valve that may be actuated to open and closed positions may be operated by a computing device coupled to the valve. In this manner, depressurization of the chamber in act 430 may be automated.

According to some embodiments, at least one inlet into the chamber through which gas is introduced during pressurization in act 420 may also be an outlet through which gas may pass during depressurization in act 430. In other cases, however, pressurization may be performed using inlets (e.g., coupled to suitable valves) distinct from outlets through which gas escapes during depressurization.

In act 440, it is determined whether the one or more additively fabricated parts are clean. That is, whether there is still powder remaining on the surface of the part(s). In some embodiments, the chamber may comprise a viewport or other means for viewing the interior of the chamber. As such, a user may examine the parts visually to determine whether additional depowdering is necessary. If the parts are considered to not be clean, method 400 may return to act 420, otherwise, the parts may be removed from the chamber in act 450 by opening the door and retrieving the parts, whether automatically and/or manually.

It may be appreciated that multiple cycles of acts 420 and 430 may be performed without pausing to determine whether the parts are clean as in act 440. For instance, numerous cycles of pressurization, depressurization, pressurization, etc. may be performed in quick sequence without significant pauses between each operation. As one example, a number of cycles, each of which comprises pressurization of the chamber followed by depressurization of the chamber, may be performed with each cycle taking between 1 s and 10 s, and with each cycle being performed in quick succession (e.g., immediately after the previous cycle or after a predetermined pause between cycles (e.g., 1-2 s)).

According to some embodiments, the one or more additively fabricated parts may be reoriented during method 400, such as prior to act 420, subsequent to act 430, or otherwise. The chamber may comprise a holder configured to hold the part(s), and the holder may be operated to move the part(s) to a new orientation. Movement of the part(s) may aid in ensuring powder is fully removed from the part(s), since without reorientation some powder may remain on the surface. This may be particularly true for powder situated within or close to internal features of the parts, which may be difficult to remove without reorienting the parts to allow the powder to escape. Internal features may include channels, lattices, cavities at the exterior surface, cavities internal to the part coupled to the exterior surface via a channel, etc. Reorientation of the part(s) may allow powder trapped deep inside a part to gradually make its way out of the part with repeated performance of acts 420 and 430. As referred to herein, powder on or in an internal feature of a part is considered to be on the "surface" of the part. Such powder is unbound powder adhered or otherwise attached to a bound region of the powder, so may be considered to be on the surface of the part even though in practice the powder may not lie on the exterior of the part.

Figure 5:
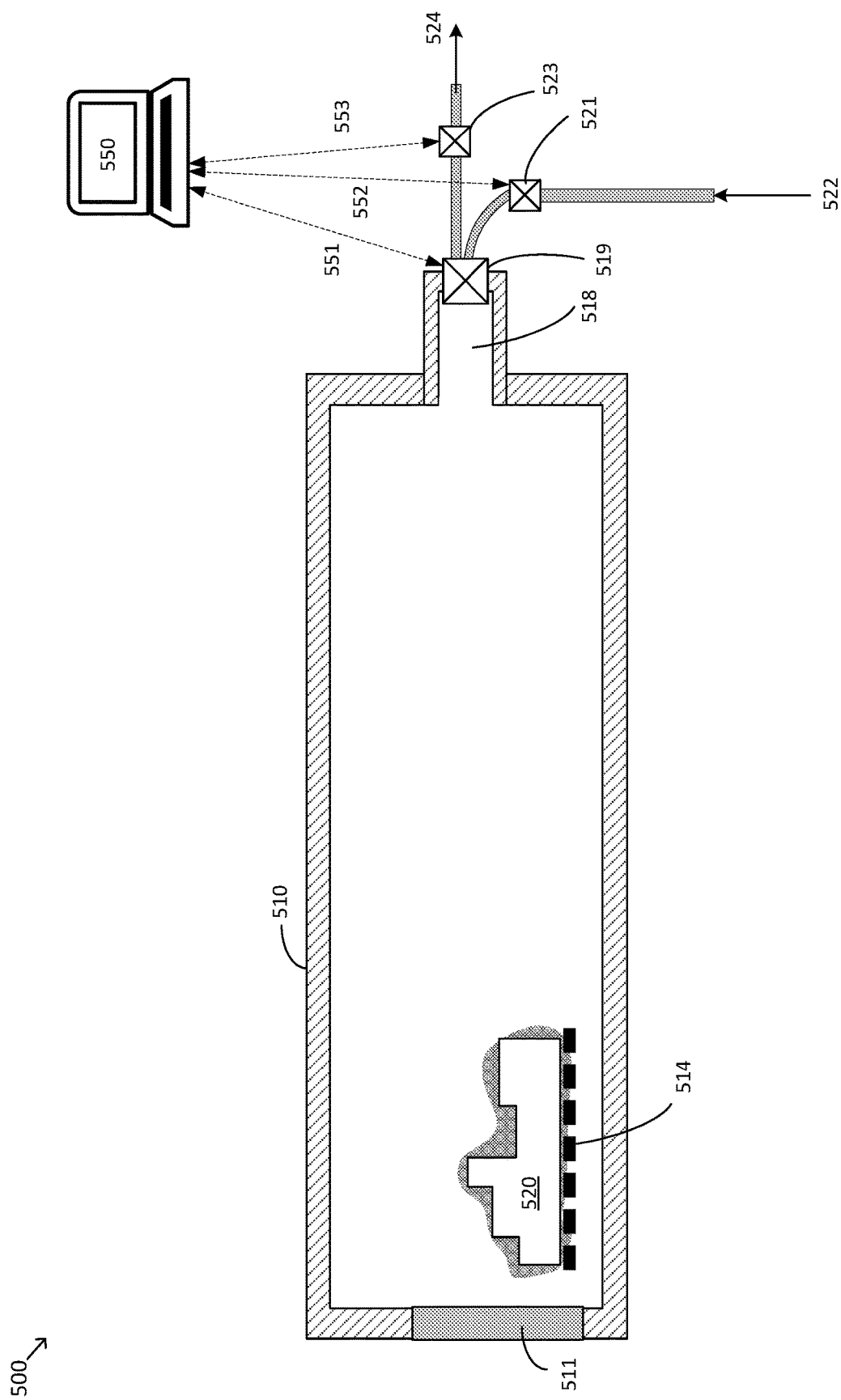
FIG. 5 depicts a cross-sectional view of a depowdering system suitable for depowdering parts through rapid pressure change, according to some embodiments.

FIG. 5 depicts a cross-sectional view of a depowdering system suitable for depowdering parts through rapid pressure change, according to some embodiments. In the example of FIG. 5, depowdering system 500 comprises a chamber 510 having a door 511 that may be opened and closed to allow additively fabricated parts 520 to be arranged on holder 514. At the opposing end of the chamber from the holder 514, an outlet 518 is arranged comprising a valve 519. The valve 519 is coupled to a source of comparatively high pressure 522, and to a source of comparatively low pressure 524. A valve 521 allows the high pressure source 522 to be opened or closed to the valve 519, and a valve 523 allows the low pressure source 524 to be opened or close to the valve 519. Valves 519, 521 and 523 may for instance comprise a ball valve or a pilot valve (e.g., a solenoid operated pilot valve).

In the example of FIG. 5, computing device 550 is configured to operate valves 519, 521 and 523 automatically as described above to perform pressurization and depressurization operations by actuating the valves through communication links 551, 552 and 553, respectively. For instance, to pressurize chamber 510, computing device 550 may operate the valves to open valves 519 and 521, and to close valve 523. The computing device may then close valves 519 and 521, then open valve 523. Subsequently, the chamber may be depressurized by opening valve 519. Cycles of these operations may be repeated by the computing device 550 to perform depowdering as described above in relation to FIG. 4.

According to some embodiments, chamber 510 may comprise one or more filters configured to inhibit or block powder from reaching the valve 519. In at least some cases, powder incident on the valve 519 may cause the valve to function less effectively, or not at all. As a result, it may be desirable to include a filter in the chamber 510, such as within the outlet 518, to block powder from reaching the valve. Since such a filter may also reduce gas flow through the outlet, it may also be preferable to include a filter able to filter the powder particles while also maximizing gas flow through the filter. A filter may for instance comprise a membrane filter and/or a high-efficiency particulate air (HEPA) filter.

According to some embodiments, chamber 510 may comprise one or more blocking structures, such as baffles, rods and/or screens. It at least some cases, it may be desirable to trap powder removed from part 520 in a selected region of the chamber (e.g., to prevent the powder from reaching valve 519). Baffles, rods and/or screens placed within the chamber between the part 520 and the outlet 518 may inhibit flow of the powder through the chamber during depressurization of the chamber, allowing the powder to be caught between the structures.

According to some embodiments, chamber 510 may be configured to be sufficiently long that powder removed from part 520 is unable to, or is unlikely to, reach the outlet 518. As discussed above, a filter placed within the chamber 510 may protect the valve 519 from powder. Similarly, the chamber dimensions may be selected to reduce the amount of powder that reaches the valve, whether in addition to, or as an alternative to, a filter. For example, an aspect ratio of the chamber defined as the ratio of the chamber length (left to right in FIG. 5) to the chamber height (top to bottom in FIG. 5) may be between 2 and 10, or between 4 and 8, or between 3 and 6. Holder 514 may be arranged at the opposing end of the chamber from the outlet 518 (and valve 519) to increase the distance between these elements.

According to some embodiments, door 511 may be configured to hinge open, slide open, or be entirely detached from the chamber 510 to provide access into the chamber. It may be desirable for door 511 to be arranged on a side of the chamber opposing the outlet 518 and hence nearby the holder 514. The door and chamber may together form a pressure seal around the door when the door is closed and attached to the chamber; components of this seal may be part of the door, part of the chamber, or part of both the chamber and the door. For instance, both the door and chamber may comprise an o-ring attached to a respective structure, wherein the structures may mate together to form a pressure seal. Latches may be provided on the door and/or the chamber to lock the structures together.

According to some embodiments, holder 514 may be configured to hold the part 520 while not significantly inhibiting powder from flowing away from the part. For example, the holder may attach to a region of the part via a clamp, allowing other regions of the part to be free within the chamber. As another example, the holder may comprise a perforated tray, such as a mesh tray, on which the part may rest. Powder may thereby flow away from the tray as well as through the perforations during depowdering. According to some embodiments, the holder 514 may comprise a perforated enclosure, such as a cage, in which the part 520 may be arranged. A perforated enclosure may allow the part 520 to be reoriented in any desired direction which still holding the part, thereby exposing different regions of the part to depowdering.

According to some embodiments, holder 514 may comprise a bag that is sealed around the part 520. During pressurization of the chamber 510, the bag may decrease in size due to the higher pressure on the outside of the bag, then during depressurization of the chamber, the bag may rapidly expand which may cause powder to move away from the part while containing the powder within the bag. As such, a bag may provide an alternative to the above-described filter as a means of protecting the valve 519 from powder. When using a bag to contain the powder removed from the part, it may be desirable to seal the bag with a significant amount of gas in it so that, as the pressure in the chamber (and outside the bag) is increased, the bag can collapse and the gas inside it can compress. In addition, it is desirable to include enough gas inside the bag so that, when the bag collapses, it does not collapse tightly around the part, which could lead to damage of the part.

In some embodiments, depowdering system 500 may comprise one or more components configured to regulate the pressure in the chamber 510. For instance, a pressure regulator may be coupled to the chamber to ensure the pressure within the chamber does not pass above a particular upper limit.

FIGS. 6A-6E illustrate a sequence of operating the depowdering system of FIG. 5, according to some embodiments. In the example of FIGS. 6A-6E, the valve 519 is a ball valve and the remaining valves and pressure sources of FIG. 5 are not shown for clarity.

Figure 6A:
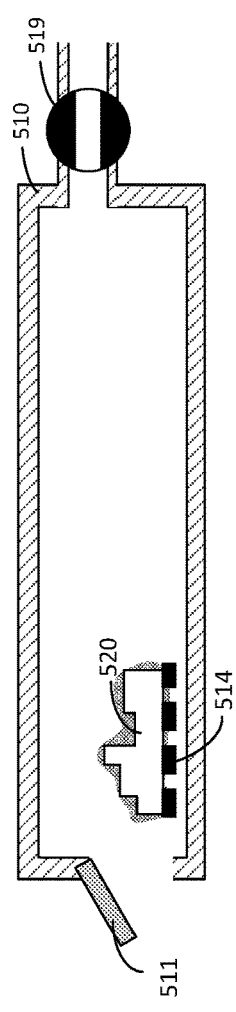
FIGS. 6A-6E illustrate a sequence of operating the depowdering system of FIG. 5, according to some embodiments.
Figure 6B:
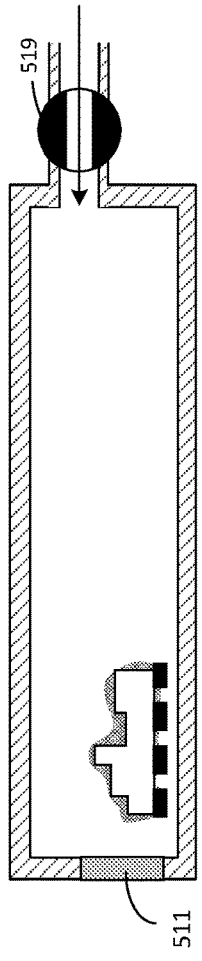
Figure 6C:
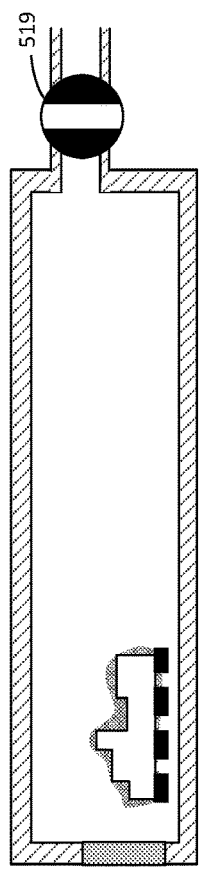
Figure 6D:
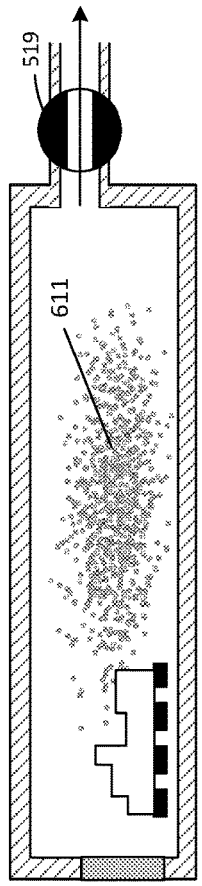
Figure 6E:
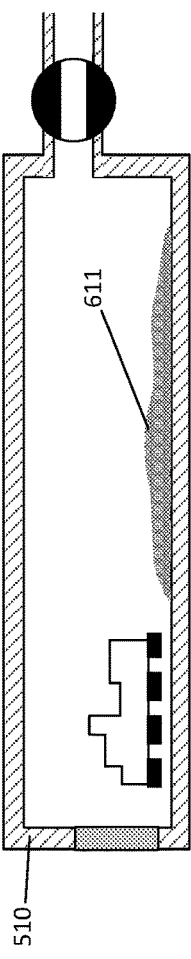

In FIG. 6A, door 511 of chamber 510 is opened and part 520 is arranged on holder 514. Subsequently, in FIG. 6B, the door 511 is closed and pressurized gas directed into the chamber through the valve 519. Once the chamber 510 is sufficiently pressurized, the valve 519 is closed as shown in FIG. 6C. In FIG. 6D, the valve 519 is opened to a lower pressure, causing gas to rush out of the valve 519 and causing powder 611 to move through the chamber toward the valve. Once the gas flow has ceased due to equalization of pressure, the powder 611 falls and settles on the bottom of the chamber 510 as shown in FIG. 6E.

Figure 7A:
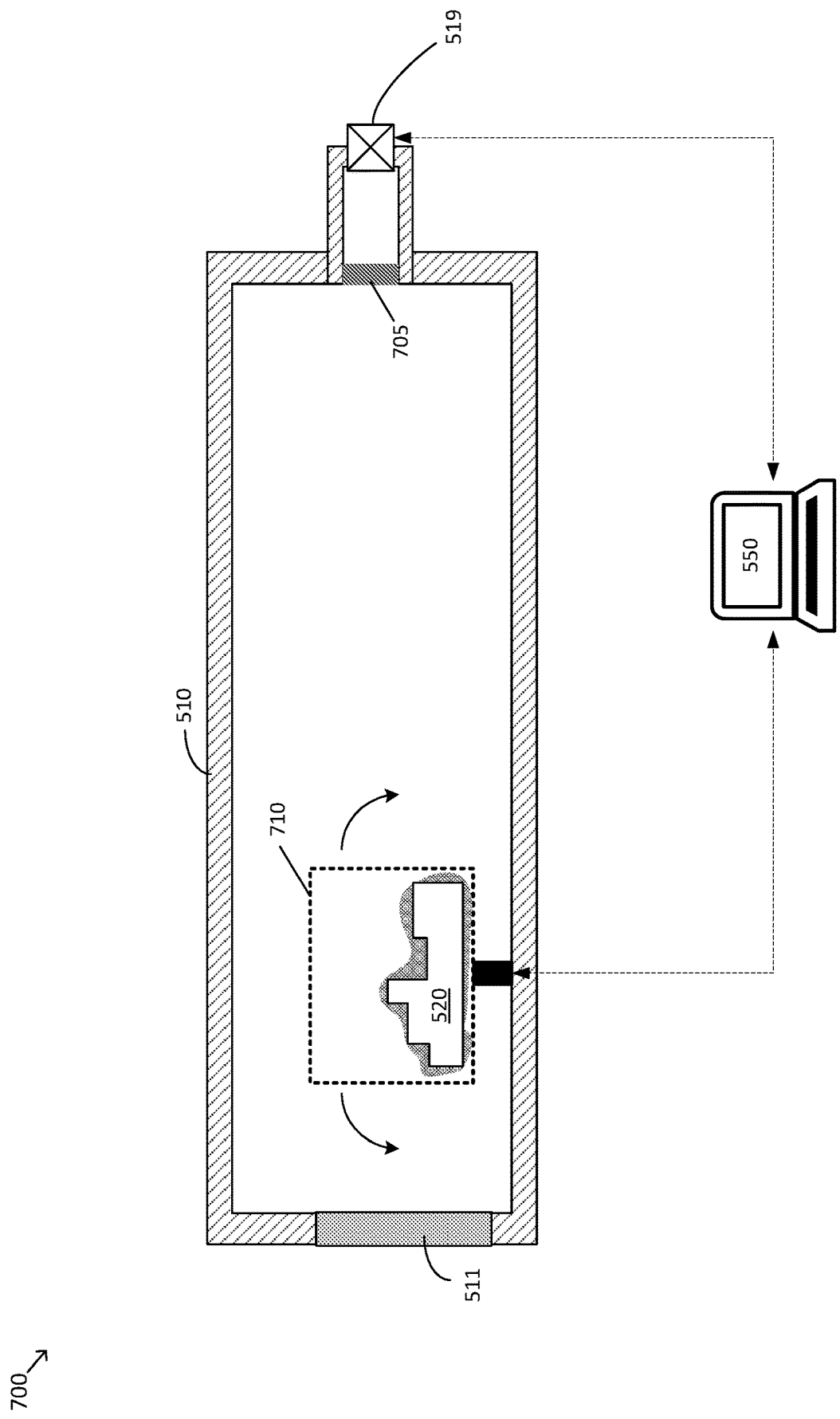
FIG. 7A depicts a cross-sectional view of a depowdering system suitable for depowdering parts through rapid pressure change that includes a cage and a filter, according to some embodiments.

FIG. 7A depicts a cross-sectional view of a depowdering system suitable for depowdering parts through rapid pressure change that includes a cage and a filter, according to some embodiments. Depowdering system 700 is an example of depowdering system 500 shown in FIG. 5 in which the holder 514 comprises a reorientable cage and the chamber comprises a filter 705. In the example of FIG. 7A, computing device 550 is configured to operate the valve 519 and to actuate holder 514 to rotate the cage 710. The cage may be rotatable in any number of different directions. For instance, a rotational actuator may be coupled to a side of the cage and operated to rotate the cage about an axis that is normal to the side of the cage. Computing device 550 may be configured to automatically reorient the part during depowdering operations in which the computing device also operates the valve 519 (and in some cases also operates other valves not shown in FIG. 7A).

Figure 7B:
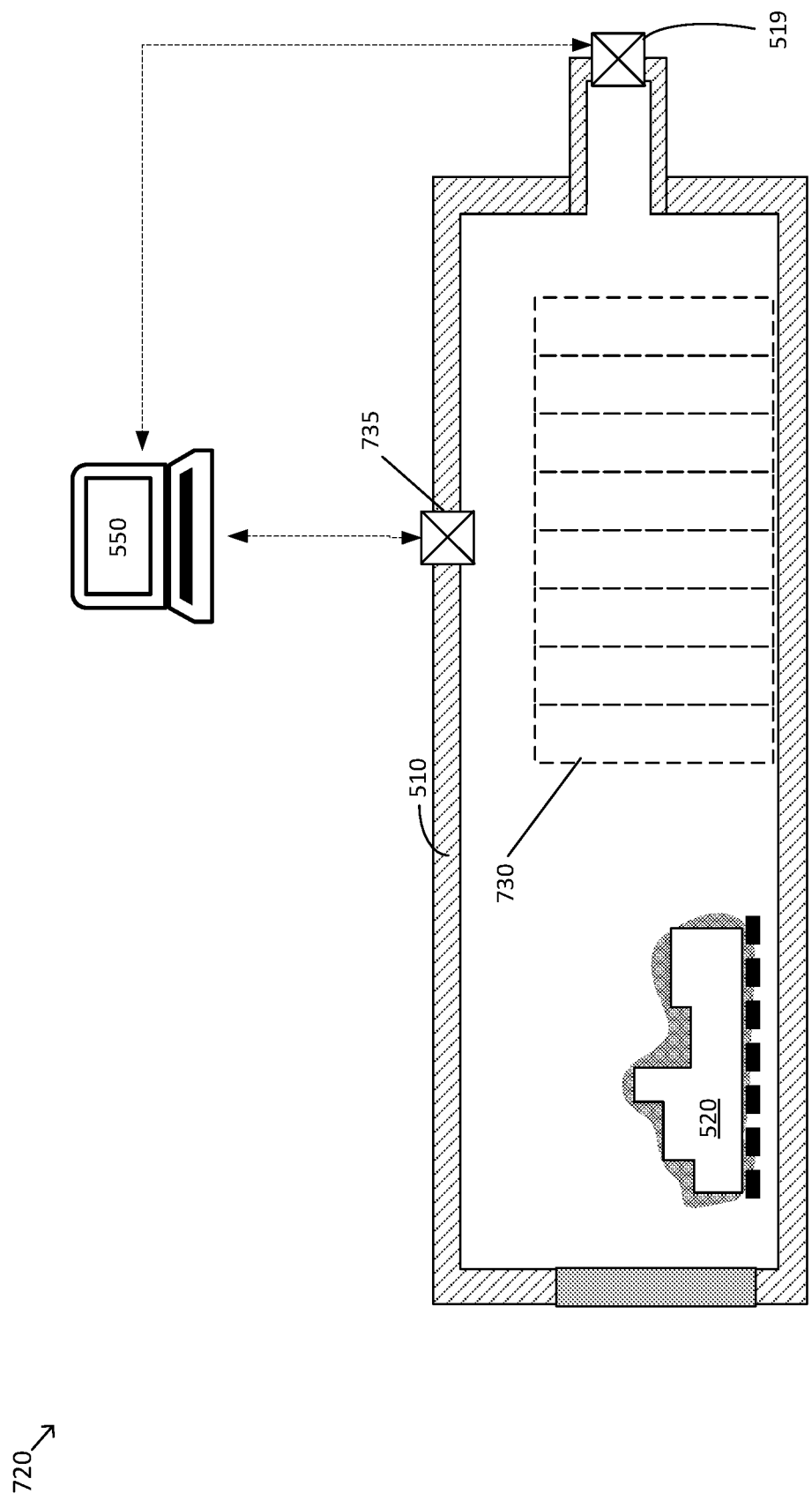
FIG. 7B depicts a cross-sectional view of a depowdering system suitable for depowdering parts through rapid pressure change that includes baffles, according to some embodiments.

FIG. 7B depicts a cross-sectional view of a depowdering system suitable for depowdering parts through rapid pressure change that includes baffles, according to some embodiments. Depowdering system 720 is an example of depowdering system 500 shown in FIG. 5 in which the chamber 510 includes baffles 730 and in which valves 519 and 740 may be independently operated by the computing device 550 to perform pressurization and depressurization of chamber 510. For instance, compressed gas may be introduced into the chamber 510 via valve 735 being opened by the computing device 550, and subsequently the chamber may be depressurized by the computing device opening valve 519.

Figure 7C:
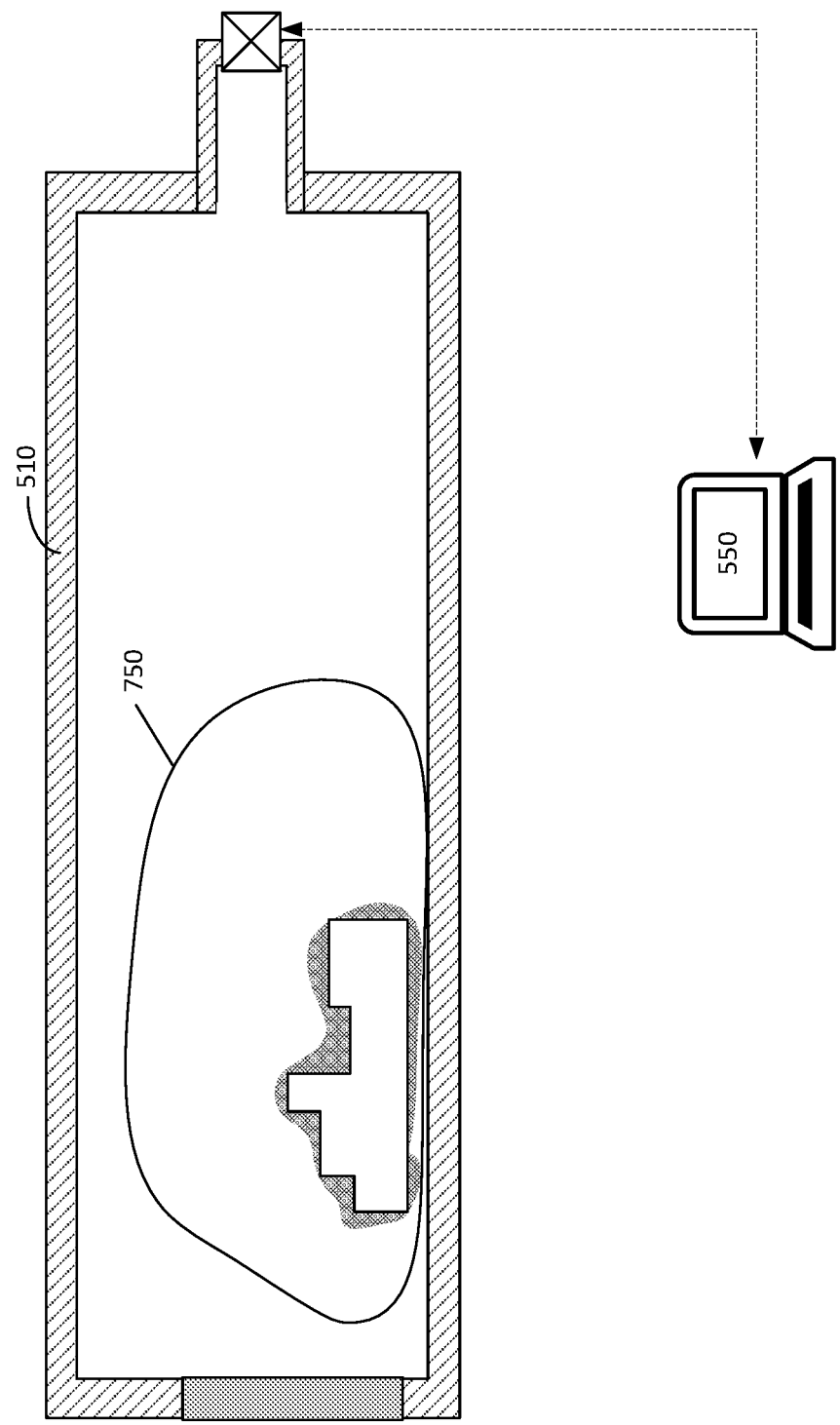
FIG. 7C depicts a cross-sectional view of a depowdering system suitable for depowdering parts through rapid pressure change that includes a bag, according to some embodiments.

FIG. 7C depicts a cross-sectional view of a depowdering system suitable for depowdering parts through rapid pressure change that includes a bag, according to some embodiments. Depowdering system 740 is an example of depowdering system 500 shown in FIG. 5 in which the holder 514 comprises a bag 750.

In each of the examples of FIGS. 5, 6A-6E, and 7A-7C, computing device 550 may be coupled to, or may be identical to, computing device 105 of FIG. 1. For instance, in the system of FIG. 1, computing device 105 may be configured to automatically control valves 519, 521 and 523 of the system of FIG. 5 as components of depowdering system 120 (and may also be configured to automatically control other aspects of depowdering system 120).

Figure 9B:
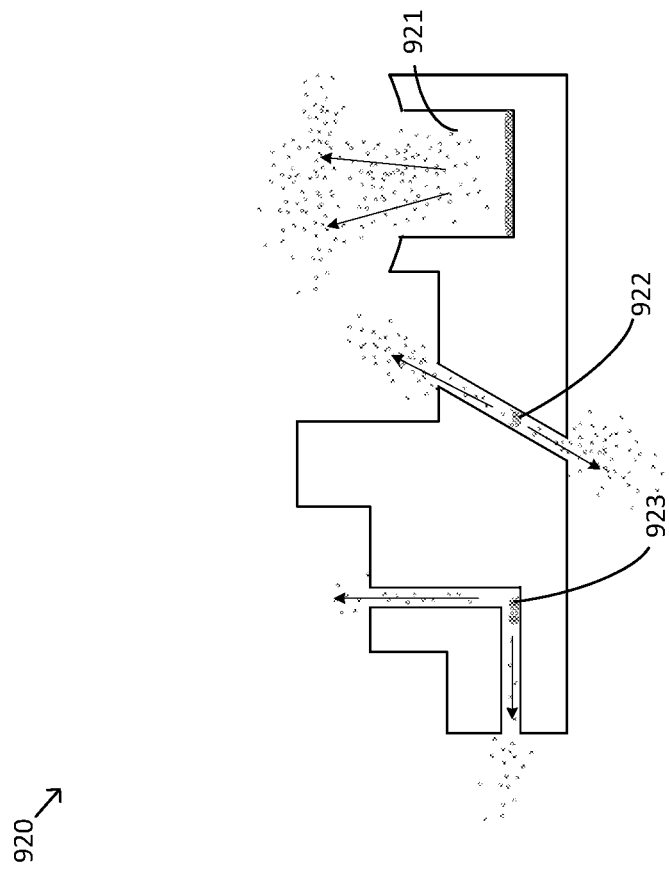
FIGS. 9A-9B illustrate an example of how depowdering via the above-described techniques may remove powder from cavities and internal channels of a part, according to some embodiments.
Figure 9A:
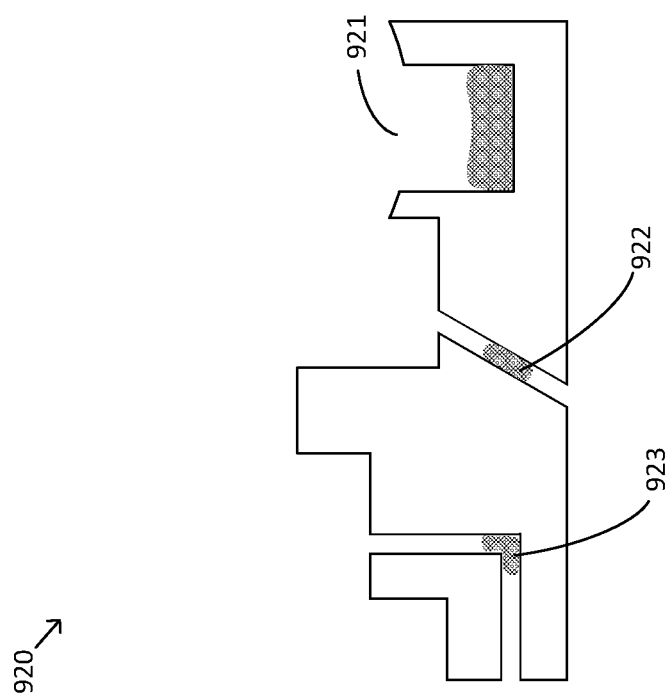

As discussed above, movement (e.g., rotation) of a part during depowdering may aid in ensuring powder is fully removed from the part. FIGS. 9A-9B illustrate an example of how depowdering via the above-described techniques may remove powder from cavities and internal channels of a part, according to some embodiments.

In the example of FIG. 9A, part 920 is shown in cross-section and includes a cavity 921, and internal channels 922 and 923. Each of the features 921-923 include some unbound powder attached to the surface of the part. As a result of depowdering via any of the above-described techniques, powder may be ejected from the cavity 921 and channels 922 and 923, as shown in FIG. 9B. For instance, by depressurizing a chamber in which part 920 is arranged (e.g., in system 500 shown in FIG. 5), powder may be moved away from the part as shown in FIG. 9B. Note that, in the example of FIG. 9B, some powder may remain in the cavity 921 and internal channels 922 and 923 due to the paths that powder has to take through the channels to escape the part. As discussed above, additional cycles of depowdering operations (e.g., repeated pressurization and depressurization), and/or movement of the part 920 to a new orientation may assist in removing additional powder from the part to obtain a clean part.

Figure 10:
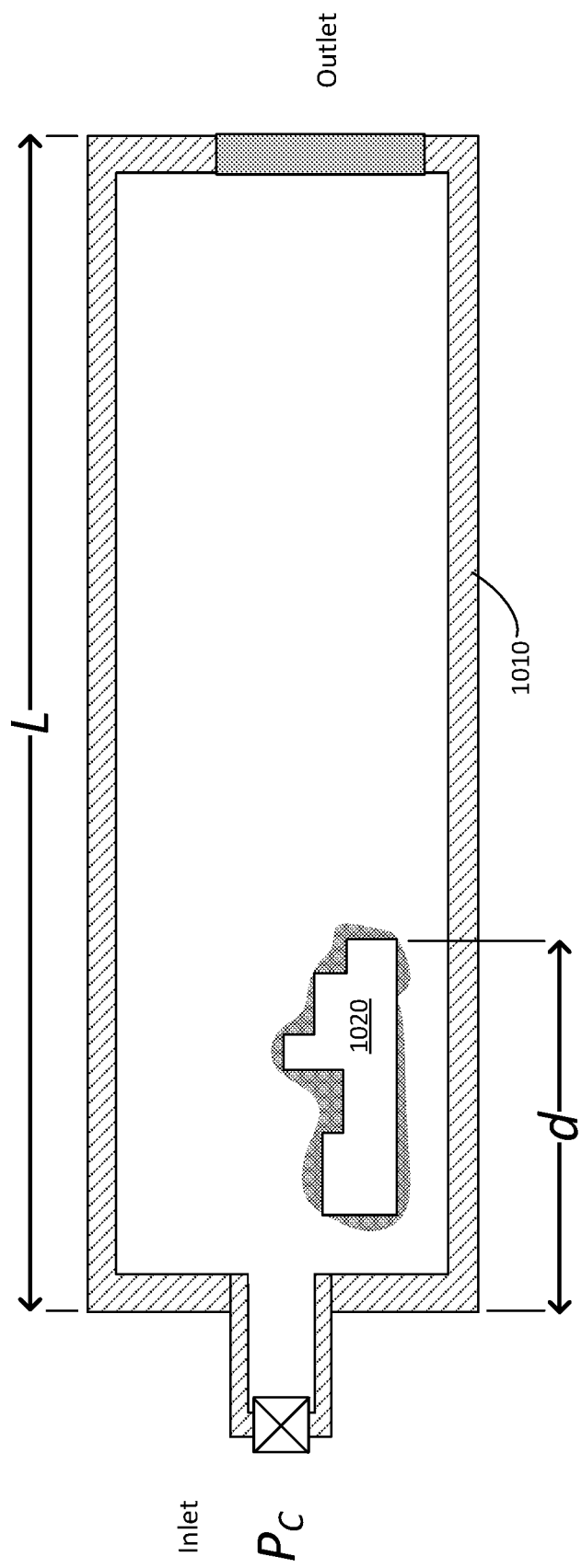
FIG. 10 depicts a cross-sectional view of various physical characteristics of a depowdering system, according to some embodiments.

FIG. 10 depicts a cross-sectional view of various physical characteristics of a depowdering system, according to some embodiments. As discussed above, a depowdering system may comprise a chamber configured so that little or no powder travels to the end of the chamber where the outlet exits. This is most easily illustrated with a chamber that is elongated in one dimension as shown in FIG. 10, however, it will be understood that the same reasoning, design and method may be applied to more general shapes of chambers.

With respect to FIG. 10, consider a case where the gas in the chamber is pressurized up to a pressure $P_c$, where $P_c$ is measured as an absolute pressure (not a pressure relative to atmosphere). Take the length of the chamber 1010 to be L, take the maximum extent of the part from the end of the chamber opposite to the outlet to be d, and take A to be the cross-sectional area of the chamber (as measured perpendicular to the length L). During operation, the chamber is pressurized to $P_c$ by opening the inlet valve with the exhaust path closed off. The maximum pressure during pressurization can be controlled through the use of a pressure regulator which determines the pressure of the gas which fills the chamber, or by other means.

When the gas within chamber 1010 is pressurized, the gas contained in the chamber between the end of the chamber and the farthest extent of the part has a volume=Ad and is at pressure $P_c$. When the pressure drops, the volume of this quantity of gas grows. If the expansion is adiabatic (and reversible), the relationship between the pressure and volume is Pressure*Volume$^\gamma$=Constant, and this relationship can give an approximate bounding of the volume increase. $\gamma$ is a ratio of specific heats and for air is approximately 1.4. For our case then, we can write the following equation:

$$P_c^*(Ad)^\gamma = P_{atm}^*(AL)^\gamma$$

where $P_{atm}$ represents atmospheric pressure. This reduces to $$P_c^* d^\gamma = P_{atm}^* L^\gamma$$

which can be rearranged to:

$$P_c = P_{atm}^* (L/d)^\gamma$$

This equation provides an absolute upper limit to the pressure that the chamber can be charged to and have the expelled powder deposit within the chamber (e.g., as shown in FIG. 6). Note that this calculation ignores any distance the powder may continue to fly due to the momentum of the powder itself, and the pressure should be somewhat de-rated from this value. The calculation is based only on the powder that is being carried by the expanding gas.

Further, this calculation assumes a reversible adiabatic expansion. Another limiting case would be an isothermal expansion in which case:

$$P_c^* d = P_{atm}^* L$$

A more conservative absolute upper limit can be then be stated as:

$$P_c = P_{atm}^* (L/d)$$

For example, for a case where d=150 mm and a chamber length L=1 m, the adiabatic calculation gives an upper limit for $P_c$ of approximately 14 atm, while the more conservative calculation gives an upper limit of approximately 6.5 atm.

According to some embodiments, a chamber may be configured with dimensions (e.g., length, height, etc.) selected based on any of the above considerations. For instance, chamber 510 within depowdering system 500 may exhibit any of the above mathematical relationships between the maximum pressure $P_c$ (e.g., as enforced by a suitable pressure regulator coupled to the chamber) and the dimensions of the chamber. Using the above conservative calculation, for example, chamber 510 may be coupled to a pressure regulator configured to regulate the pressure in the chamber to at or below 6.5 atm and may have a length of 1 m and may include a holder configured to hold parts such that the parts extend no further than 150 mm from the end of the chamber opposing the outlet.

An illustrative implementation of a computing device 800 that may be used to perform any of the techniques described above is shown in FIG. 8. The computer system 800 may include one or more processors 810 and one or more non-transitory computer-readable storage media (e.g., memory 820 and one or more non-volatile storage media 830). The processor 810 may control writing data to and reading data from the memory 820 and the non-volatile storage device 830 in any suitable manner, as the aspects of the invention described herein are not limited in this respect. To perform functionality and/or techniques described herein, the processor 810 may execute one or more instructions stored in one or more computer-readable storage media (e.g., the memory 820, storage media, etc.), which may serve as non-transitory computer-readable storage media storing instructions for execution by the processor 810.

In connection with techniques described herein, code used to, for example, generate instructions that, when executed, cause an additive fabrication device to fabricate one or more parts, cause a depowdering system to automatically perform depowdering operations (e.g., opening/closing one or more valves, opening/closing a door, activating/deactivating a pressure source, etc.) may be stored on one or more computer-readable storage media of computer system 800. Processor 810 may execute any such code to perform any of the above-described techniques as described herein. Any other software, programs or instructions described herein may also be stored and executed by computer system 800. It will be appreciated that computer code may be applied to any aspects of methods and techniques described herein. For example, computer code may be applied to interact with an operating system to transmit instructions to an additive fabrication device or depowdering system through conventional operating system processes.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

The above-described techniques may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A depowdering system for removing powder from one or more additively fabricated parts comprising bound metal powder and having unbound metal powder on their surface, the depowdering system comprising:
 a chamber having a length and a height, wherein the ratio of the length to the height is between 2 and 5, the chamber comprising:

a door configured to be opened and closed such that the one or more additively fabricated parts can be introduced into the chamber when the door is opened;

a holder arranged within the chamber at a first side of the chamber and configured to hold the one or more additively fabricated parts; and a first valve arranged at a second side of the chamber, the second side opposing the first side of the chamber; and at least one processor configured to control at least the first valve to perform a series of depowdering operations, each depowdering operation comprising:

pressurizing the interior of the chamber to a first pressure; and opening the first valve to a second pressure, lower than the first pressure, to depressurize the interior of the chamber.

2. The depowdering system of claim 1, wherein the holder comprises a bag in which the one or more additively fabricated parts may be sealed.

3. The depowdering system of claim 1, wherein the holder comprises a cage.

4. The depowdering system of claim 1, further comprising one or more actuators coupled to the first valve, and wherein opening the first valve by the at least one processor comprises operating the one or more actuators to open the first valve.

5. The depowdering system of claim 1, further comprising a plurality of baffles arranged within the chamber between the holder and the first valve.

6. The depowdering system of claim 1, further comprising a filter arranged between the first valve and the interior of the chamber.

7. The depowdering system of claim 1, further comprising a pressure seal configured to be coupled to the door when the door is closed.

8. The depowdering system of claim 1, further comprising a source of compressed gas coupled to the chamber.

9. The depowdering system of claim 8, further comprising a second valve, and wherein the source of compressed gas is coupled to the chamber via the second valve.

10. The depowdering system of claim 9, wherein the at least one processor is configured to pressurize the interior of the chamber to the first pressure by opening the second valve to a source of the first pressure.

11. The depowdering system of claim 8, wherein the source of compressed gas is coupled to the chamber via the first valve.

12. The depowdering system of claim 1, wherein the chamber further comprises a transparent window.

13. The depowdering system of claim 1, wherein opening the first valve to the second pressure comprises opening the first valve to atmospheric pressure.

14. The depowdering system of claim 1, wherein opening the first valve to the second pressure comprises opening the first valve to a vacuum pump.

15. The depowdering system of claim 1, wherein opening the first valve to the second pressure comprises opening the first valve to a pressure below that of atmospheric pressure.

* * * * *

UNITED STATES PATENT AND TRADEMARK OFFICE
CERTIFICATE OF CORRECTION

| | | |
|---|---|---|
| PATENT NO. | : 11,511,350 B2 | Page 1 of 1 |
| APPLICATION NO. | : 17/274336 | |
| DATED | : November 29, 2022 | |
| INVENTOR(S) | : Emanuel M. Sachs et al. | |

It is certified that error appears in the above-identified patent and that said Letters Patent is hereby corrected as shown below:

On the Title Page

Item (60), Related U.S. Application Data, please replace:
"Provisional application No. 62/730,953, filed on Sep. 13, 2019."
With:
-- Provisional application No. 62/730,953, filed on Sep. 13, 2018. --

Signed and Sealed this
Seventh Day of February, 2023

Katherine Kelly Vidal
*Director of the United States Patent and Trademark Office*